United States Patent Office 3,679,383
Patented July 25, 1972

3,679,383
PROCESS FOR THE MANUFACTURE OF SHAPED ARTICLES OF ZIRCONIUM CORUNDUM
Peter Hack, Ranzel, Troisdorf, Karl Hass, Niederkassel, and Georg Schinke, Ranzel, Troisdorf, Germany, assignors to Dynamit Nobel Aktiengesellschaft, Troisdorf, Germany
No Drawing. Continuation-in-part of application Ser. No. 757,452, Sept. 4, 1968. This application Feb. 17, 1970, Ser. No. 14,811
Claims priority, application Germany, Sept. 5, 1967, D 54,018
Int. Cl. C09c 1/68
U.S. Cl. 51—309
7 Claims

ABSTRACT OF THE DISCLOSURE

Process for manufacturing shaped articles of zirconium corundum which comprises shaping a fine grained eutectic mixture of low-silica bauxite and zirconium oxide, possibly in admixture with an organic binding agent and heating the shaped bodies in a reducing atmosphere at a temperature of 1250–1500° C. or in an oxidizing atmosphere at a temperature of 1400–1600° C.

---

This application is a continuation-in-part of application Ser. No. 757,452, filed Sept. 4, 1968 and now abandoned.

This invention deals with a process for the manufacture of shaped articles of zirconium corundum. It is more particularly concerned with a method for the manufacture of shaped articles from zirconium corundum prepared from a eutectic mixture of low-silica bauxite and zirconium oxide.

It is known that the fusion of a eutectic mixture of about 58 wt. percent aluminum oxide and about 42 wt. percent zirconium oxide in an electric arc furnace results in the formation of a product characterized by a particularly high compressive strength. This product, which is known as zirconium corundum, is manufactured today on a large technical scale. It is especially useful as an abrasive for high-pressure grinding processes. The melting is carried out in a tiltable furnace. The molten material is spilled off into thick-walled pouring ladles, and then hardens very rapidly. Abrasive grits for high-pressure grinding wheels are produced from the hardened material in the conventional manner by breaking and crushing.

The melting process, however, is a difficult one to carry out. The aluminum oxide component in the batch consists as a rule of bauxite. As the melting must be done using carbon electrodes, an alloy containing Fe-Si and Ti develops as a reduction product from the impurities in the bauxite, and this alloy has to be removed by magnetic separation techniques from the refined product.

This reduction process is further undesirable, in that it adds nothing to the value of the corundum, and on the contrary is harmful, as the reduction products remaining in the corundum even after the refining interfere with certain additional working processes. As a rule, too, it is undesirable to allow chemical reduction to diminish the $TiO_2$ content. Furthermore, it is difficult to control the course of the reduction process. Relatively great variations in the chemical composition of the end product and in its physical properties are therefore unavoidable in such corundums.

It is an object of this invention to provide a process for manufacturing shaped articles of zirconium corundum which is simple and relatively inexpensive.

It is another object of this invention to provide a process for manufacturing shaped articles of zirconium corundum which leads to a product of regular composition and of desirable properties.

These and still further objects will become apparent from the following description.

In accordance with the present invention, it has now been found that the manufacture of shaped articles of zirconium corundum having improved chemical and physical properties may be effected in a particularly favorable manner by shaping a fine-grained eutectic mixture of low-silica bauxite and zirconium oxide using organic binding agents if desired, and sintering the articles thereby formed either in a reducing atmosphere at temperatures of 1250–1500° C. and preferably 1280–1400° C. or in an oxidizing atmosphere at temperatures of 1400–1600° C. It is advantageous to mix the low-silica bauxite with zirconium oxide that contains at least 95% $ZrO_2$, and wherein at least 70% of the components have a grain size under 5 microns. In order to stabilize the formed articles prepared according to the invention from zirconium corundum, so that they may better withstand varying temperatures in high ranges, 4 to 5 wt. percent of calcium oxide, 6 to 7 wt. percent of magnesium oxide or 8 to 9 wt. percent of yttrium oxide, preferably in a grain size of less than 5 microns, can be admixed with the raw materials prior to sintering. The amounts of the foregoing additions is to be calculated with reference to the amount of zirconium oxide present in said mixtures.

The term "eutectic mixture of the components is, according to the invention, one in which there is 56 to 60 wt. percent aluminum oxide and 42 wt. percent zirconium of zirconium oxide, while the precise eutectic lies at 58 wt. percent aluminum oxide and 42 wt. percent zircorium dioxide.

Suitable organic binding agents include, for example, wax emulsions, dextrin, polyviol, tylose, sulfite waste liquor, tar and the like.

A low-silica bauxite is to be understood as one which contains about 1 to about 5 wt. percent of $SiO_2$.

The following examples are illustrative but not limitative of the present invention.

EXAMPLE 1

A mixture was prepared from 3 parts by weight of completely dry bauxite from Dutch Guiana, and 2 parts by weight of monoclinic zirconium oxide. Both of the components of the mixture had a fineness of 72% less than 5 microns. The coarsest components had a size of about 20 microns. The two materials had the following analyses:

| | Bauxite, percent | Zirconium oxide, percent |
|---|---|---|
| $SiO_2$ | 2.59 | 1.30 |
| $Fe_2O_3$ | 6.57 | 0.23 |
| $TiO_2$ | 3.69 | 0.10 |
| $CaO$ | 0.05 | |
| $Al_2O_3$ | 87.04 | 0.11 |
| $ZrO_2$ | | 98.26 |

Bricks were pressed from this mixture having approximately the same dimensions as standard building bricks. The bricks were then sintered in a reducing atmosphere at about 1290° C. or in an oxidizing atmosphere at 1450° C., for about one hour. Abrasive grits were then prepared from these sintered bricks in the conventional manner by breaking, crushing and screening.

Resistance to attrition is a factor that indicates whether abrasive grits are suitable for use at high contact pressures. The resistance to attrition is determined by a standard method developed by the Battelle Institute and recognized and used by the "Verein Deutscher Schleifmittelwerke" (association of German Abrasive Manufacturers). A sample of 125 g. of exactly equal-sized grits (known as rated grit) was milled under defined conditions in a test ball mill until 33.3% has been reduced in size to such an extent that it falls through a test sieve. The results of this test are in accord with the results obtained in actual grinding. Therefore, the Battelle Method is used as a standard method for evaluating and comparing the performance of abrasive grits.

In the comparison of No. 12 grit prepared from sintered zirconium corundum prepared according to the invention with the same grit obtained from zirconium corundum prepared by melting, the following values were obtained:

|  | Melted zirconium corundum | Sintered zirconium corundum |
| --- | --- | --- |
| Bulk weight, g./l | 1,920 | 1,840 |
| Revolutions | 692 | 2,290 |

Although due to the somewhat different milling, the shape of the grits obtained from the zirconium corundum prepared by sintering was less favorable, the number of revolutions, which is the characteristic of the Battelle test, was more than three times as great for the zirconium corundum prepared according to the invention.

EXAMPLE 2

The mixture of bauxite and zirconium oxide described in Example 1, with the addition of 0.05 wt. percent of one of the binding agents set out in the above description, was extruded into strips of varying cross section. From these strips pieces of any desired size can be prepared, which can be used after sintering as an abrasive for special grinding processes.

Not only abrasives can be made from the sintered product, in addition many different and varied molded articles can be prepared by sintering from the plastically shaped mixture of bauxite and zirconium oxide.

EXAMPLE 3

The mixture as set out in Example 1 was introduced by means of a vibrating feeder onto a granulating plate, which was being sprayed on its route by means of a spray nozzle with an aqueous solution of an organic binding agent, until spheres of the desired size had formed on the granulating plate. The binding agent served merely as a cement for the production of the necessary strength in the raw state. Conventional ceramic binding agents which form a vitreous phase were not added. A granular product was thus formed having an abrasive grit grain size ranging from No. 10 to No. 16, with a definite maximum in the desired grit sizes Nos. 12 and 14. The granulation was continued until the highest possible density had been achieved. The pellets thus prepared were entirely round and exhibited no moisture on the surface.

Prior to sintering the pellets were carefully dried at about 75° C. They were then sintered in a reducing atmosphere at about 1300° C. The sintering was carried out in a discontinuously operating rotary tubular kiln. The sintered pellets were rapidly cooled in the air and screened to the sizes corresponding to standard abrasive grits.

The pellets thereby obtained also exhibited an extraordinarily high resistance to attrition and pressure when tested by the Battelle method.

EXAMPLE 4

The mixture of bauxite and zirconium oxide described in Example 1 was prepared but in addition there were included 0.1 wt. percent calcium oxide having a grain size of approximately 4μ.

The mixtures were pressed to form small tubes which were further worked as set out in Example 1.

The pellets of sintered zirconium corundum prepared according to the invention can be used in many ways. Their high resistance to attrition makes them especially useful for use as heat carriers in catalytic processes. Their compressive strength is advantageous when they are used as air-blast cleaning agents; in this latter application they are superior to other non-metallic agents, the treated surfaces remaining uncontaminated by metal in the blasting agent. Because of their relatively great weight, they are also suitable for descaling and deburring and for peening the surfaces to be treated. The appearance of surfaces treated with such pellets is especially attractive. The pellets are also suitable for use as grinding balls.

Oxide ceramic articles can be manufactured from corundum of great fineness by the known methods. Because of its high resistance to wear, oxide ceramic is suitable for use, for example, in thread guides, drawing dies for wires, grinding balls, pump parts and the like. The mechanical properties, particularly abrasion resistance, of such parts can be substantially improved when they are prepared on a basis of sintered zirconium corundum. The high compressive strength and wear resistance of sintered zirconium corundum make it also suitable for protective linings against abrasion, as for example, in linings for mills.

The reducing atmosphere mentioned in Example 1 (p. 5, line 3) and Example 3 (p. 7, line 12) can be realized by using air or nitrogen containing carbon monoxide. For practical purposes it is preferred (cf. Example 1) to work in a sinter-device having at its bottom granulated carbon, e.g. charcoal, upon which the articles of bauxite or zirconium oxide shaped according to the invention are placed. Thereupon another layer of granulated carbon is put. The most profitable to do constitutes in conducting a small nitrogen- and air-current, respectively, through the sinter-device during sintering. When the temperatures are high enough a sufficient quantity of carbon monoxide develops.

Another possibility for the realisation of a reduced atmosphere is to use a Tammann-furnace. A Tammann-furnace is an electrical resistance-furnace the walls whereof are made of carbon.

A third possibility to realize a reduced atmosphere is the following. The heat necessary for sintering is produced by means of an incomplete combustion of natural gas, city gas or other combustible gases. That means it is operated with an oxygen-deficit during the combustion and the waste gases are then directed straightway into the sinter-furnace.

The oxidizing atmosphere mentioned in Example 1 (p. 5, line 4) can be realized by using gases containing oxygen. The easiest would be to use air. Air with an additional oxygen-content (cf. Example 3) or nitrogen with an oxygen-content may also be used. In case the heating is effected by means of combustion of natural gas, city gas or the like, it has to be worked with an oxygen-excess.

What is claimed is:

1. Process for manufacturing shaped articles of zirconium corundum which comprises shaping a fine grained mixture of particles of low-silica completely dry bauxite and zirconium oxide containing at least 95% $ZrO_2$ in the proportion of a eutectic mixture of 56 to 60 wt. percent of alumina and 44 to 40 wt. percent of the zirconium oxide, at least 70% of the particles having a particle size less than 5 microns and heating the shaped articles thereby formed at a temperature of from 1250–1600° C. to sinter the particles to form said shaped article.

2. Process according to claim 1 wherein said alumina is present in an amount of 58 wt. percent and said zirconium oxide is present in an amount of 42 wt. percent.

3. Process according to claim 1 which comprises conducting the heating in a reducing atmosphere at a temperature of from 1250–1500° C.

4. Process according to claim 1 which comprises conducting the heating in a reducing atmosphere at a temperature of from 1280–1400° C.

5. Process according to claim 1 which comprises conducting the heating in an oxidizing atmosphere at a temperature of from 1400–1600° C.

6. Process according to claim 1 wherein said mixture additionally contains at least one member selected from the group consisting of calcium oxide, magnesium oxide and yttrium oxide in amounts as follows referred to the amount of zirconium oxide:
   calcium oxide—4 to 5 wt.-percent.
   magnesium oxide—6 to 7 wt.-percent.
   yttrium oxide—8 to 9 wt.-percent.

7. Process according to claim 1, wherein the shaped articles are size reduced to form abrasive grits therefrom.

References Cited
UNITED STATES PATENTS

| | | | |
|---|---|---|---|
| 2,270,607 | 1/1942 | Ryschkewitsch | 51—309 |
| 2,404,598 | 7/1946 | Sachse | 51—309 |
| 3,181,939 | 5/1965 | Marshall et al. | 51—309 |
| 3,428,443 | 2/1969 | Davis | 51—309 |
| 3,454,385 | 7/1969 | Amero | 51—309 |
| 3,387,957 | 6/1968 | Howard | 51—309 |

DONALD J. ARNOLD, Primary Examiner

U.S. Cl. X.R.

51—308; 106—57, 65

UNITED STATES PATENT OFFICE
CERTIFICATE OF CORRECTION

Patent No. 3,679,383              Dated July 25, 1972

Inventor(s) Peter Hack, et al.

It is certified that error appears in the above-identified patent and that said Letters Patent are hereby corrected as shown below:

Col. 2, line 28 change "and 42 wt. percent zirconium" to

--for 44 to 40 wt - %--

Signed and sealed this 2nd day of January 1973.

(SEAL)
Attest:

EDWARD M. FLETCHER, JR.            ROBERT GOTTSCHALK
Attesting Officer                   Commissioner of Patents